Figure 1:
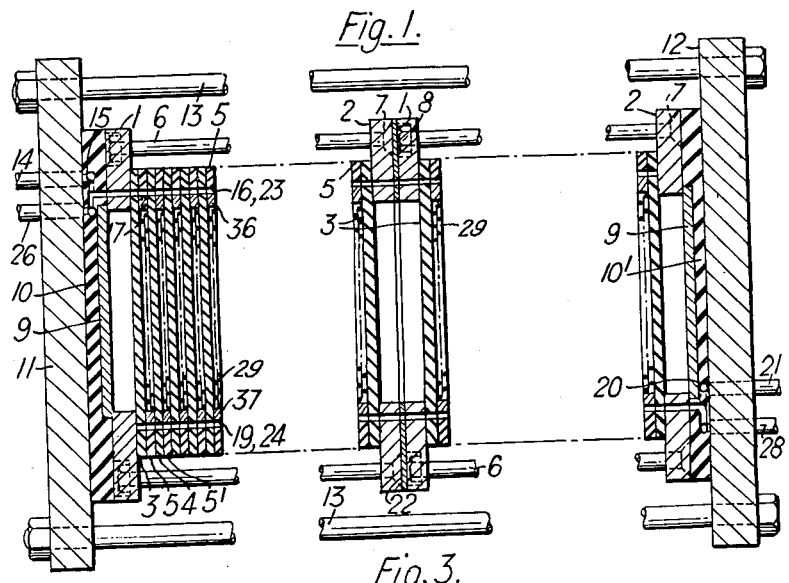

Inventors
William John Roberts
Albert William John Rogers

By Bailey, Stephen Hetty
Attorneys

Jan. 15, 1963 W. J. ROBERTS ET AL 3,073,774
ELECTRODIALYTIC CELLS
Filed Aug. 10, 1961 3 Sheets-Sheet 2

Inventors
William John Roberts
Albert William John Rogers
By
Bailey, Stephens & Heatly
Attorneys Jan. 15, 1963  W. J. ROBERTS ET AL  3,073,774
ELECTRODIALYTIC CELLS
Filed Aug. 10, 1961  3 Sheets-Sheet 3

United States Patent Office  3,073,774
Patented Jan. 15, 1963

3,073,774
ELECTRODIALYTIC CELLS
William J. Roberts, 67 Ormond Drive, Hampton, England, and Albert William John Rogers, 31 Alexandra Gardens, Hounslow, England
Filed Aug. 10, 1961, Ser. No. 130,629
4 Claims. (Cl. 204—301)

This invention relates to electrodialytic cells comprising a stack of ion-permeable membranes separated by hollow spacers, the whole assembly being held between end plates. Each spacer in effect forms a frame and when this is assembled between plane membranes its hollow centre forms the compartment through which an electrolyte flows. The spacers are usually made of a plastic, for example, plasticised polyvinyl chloride, or of rubber.

In such cells at least every alternate membrane is ion-selective, i.e. selectively permeable to ions of one sign, and usually the membranes are alternately selectively permeable to cations and anions.

The purpose of these cells is to enable ions to leave one electrolyte and enter another, and the electrolytes are introduced into the compartments from passages formed by registering holes in the spacers and membranes through lateral passages in the spacers or in members inserted in the spacers.

The width of each compartment, i.e. the distance between adjacent membranes, may be as small as 50-thousandths of an inch or even less and, as the membranes are flexible, the problem of ensuring that they remain at the correct distance apart is not easy to solve. It is customary to put either a corrugated and perforated sheet of material or a coarsely woven material in each compartment to act as a filler between the membranes bounding the compartment. This filler must present the minimum resistance to flow and be an electrical insulator. At the same time it is important that the flow of liquid through the compartment should be such that thorough mixing takes place, since otherwise scale may form on one or another of the membranes bounding the compartment.

The usual fillers suffer from a number of disadvantages. For instance, the corrugated perforated material is costly to produce since the flat sheet has first to be perforated and then to be hot-pressed between a pair of corrugated metal platens. These platens have to be fairly heavy to withstand the pressure and to be accurately machined. Such a tool is intrinsically expensive to produce, especially if large sheets of filler are to be made, and once made it cannot be corrected easily for small errors in dimensions (and if the corrugations are too small it cannot be corrected at all). Since the overall thickness of the corrugated material is ideally required to be the thickness of the compartment, i.e. about 50-thousandths of an inch, even small errors in the thickness can be an appreciable fraction of the cell thickness.

The corrugated material tends to have a "memory" of its original flat shape and is accordingly easily deformed towards a smaller thickness. It then no longer fills the compartment space accurately.

Because of the small width of the compartment, a coarse weave also needs to be made to an accurate thickness. However this is not easy and the thickness cannot accurately be predicted before weaving. Since looms tend to weave to a particular thickness any errors cannot be corrected.

The weaves must, of course, be made of an insulating material and are invariably of a plastic, e.g. polythene. The threads of these materials are slippery, and the woven threads therefore slide one over another, the mesh being thereby deformed. Weaves with meshes greater than about ¼ inch cannot in fact be made at all as they have no strength whatever to resist this defect.

When a weave is cut to a particular size, the immediate edges have nothing to support them and they simply slip out. This weakens the hold on the adjacent threads and they tend to slip out also. The edges in fact fray progressively and if the sheet has been much handled it becomes useless because of this. Because of this slipping out of threads, the sheet must always be cut between the parallel threads, which means that it cannot be cut accurately to any desired size. It can only be cut in increments of the thread separation. As a result it is very likely that the nearest size sheet that can be cut is about ⅛ of an inch or ¼ of an inch smaller all round than the compartment. The result is that the water runs preferentially along the empty area, i.e. there is channelling, which is undesirable.

The weaves have no resistance to lateral deformation and a rectangular sheet is easily pulled into a parallelogram. This means it is difficult to fill the cross-sectional area of the compartment accurately.

Accordingly the main object of the present invention is the provision of an electrodialytic cell incorporating fillers which suffer from none of the above disadvantages.

According to the present invention the fillers are unitary sheets resembling woven fabric in which the equivalent of the weft and warp threads do not interlace but form two layers with each weft thread in contact with and united to each warp thread that it crosses.

Figure 3:
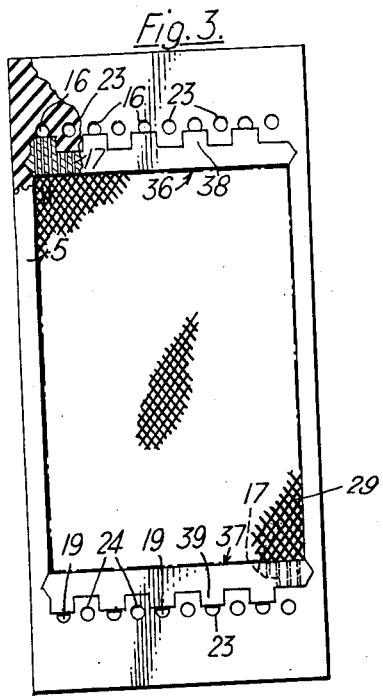
Figure 2:
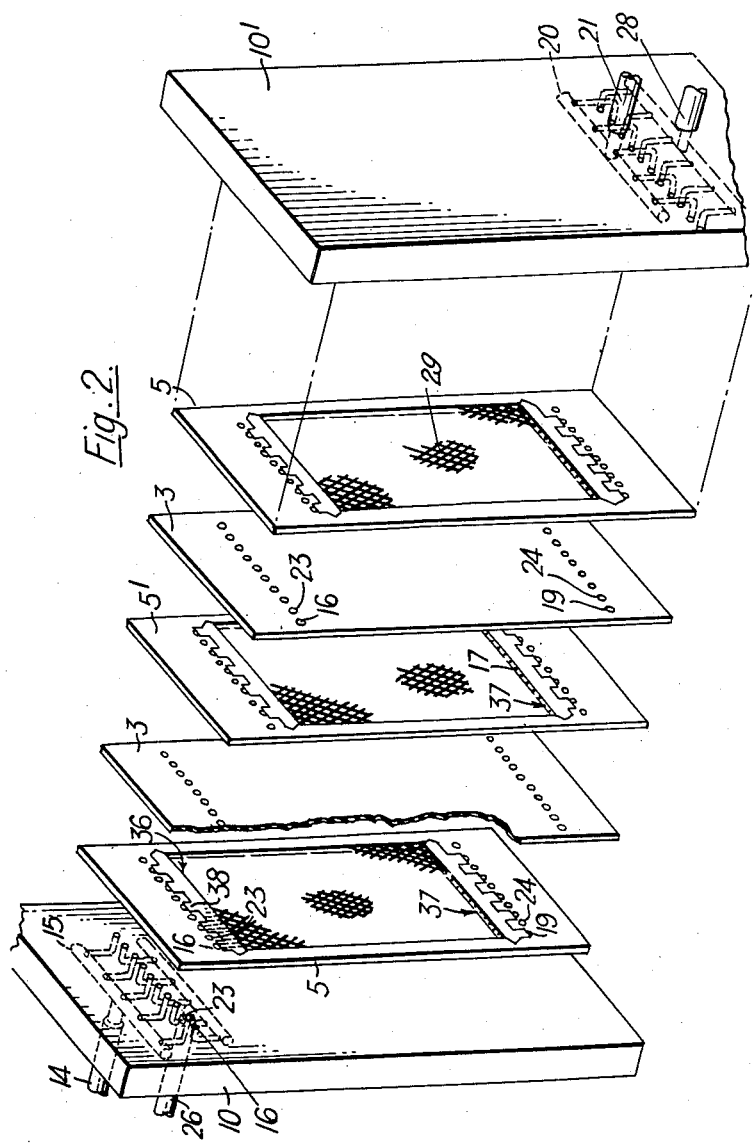
Figure 4:
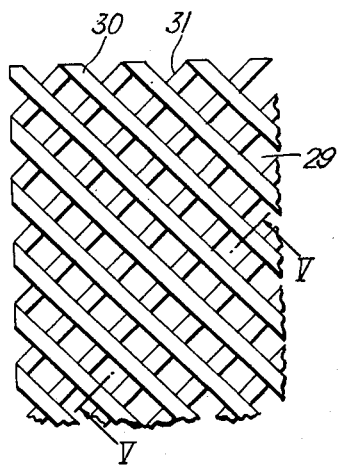
Figure 5:
Figure 6:
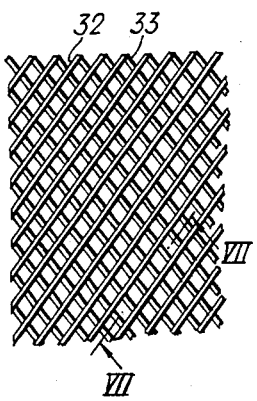
Figure 7:
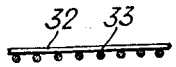

The invention will be more fully understood from the following detailed description of a typical cell and its fillers, wherein reference is made to the annexed drawings in which:

FIGURE 1 is a diagram of a typical cell;
FIGURE 2 is an exploded view of parts of the cell;
FIGURE 3 is an enlarged view of a typical spacer with a filler in position;
FIGURE 4 is a plan of part of one filler;
FIGURE 5 is a cross-section on the line V—V in FIGURE 4;
FIGURE 6 is a plan of another filler; and
FIGURE 7 is a cross-section on the line VII—VII in FIGURE 6.

The cell shown in FIGURES 1 and 2 comprises units each composed of two rigid spacers 1 and 2, one at each end, anion-selective membranes 3 alternating with cation-selective membranes 4, and flexible spacers 5 and 5' alternately separating adjacent membranes. The spacers 5 and 5' are rectangular frames and the central space within each bounded in the longitudinal direction by two adjacent membranes forms a compartment.

The members forming each unit are united by bolts 6 having heads 7 countersunk into the rigid spacer 2 of the unit and nuts 8 fitting in cavities in the rigid spacer 1 of the unit. The spacers 1 and 2 extend outwards beyond the membranes and flexible spacers to receive the bolts 6.

The units with gaskets 22 between them are assembled end to end between electrodes 9 constituted by metal or carbon plates let into insulating supports 10 and 10'. The whole assembly thus formed is clamped between plates 11 and 12 which extend outwards beyond the rigid spacers to receive bolts 13 which are tightened up to apply the endwise clamping pressure.

The unit construction made possible by the provision of the rigid spacers 1 and 2 is not essential to the cell, though it is very convenient in practice.

In use an electrolyte is supplied to every alternate compartment through a pipe 14 which discharges into a recess 15 in the plate 10. This recess communicates with the ends of a set of parallel conduits each formed by registering holes 16 in the plate 10 and in all the membranes and spacers, the holes in the spacers lying in a row behind one edge of the spacer and intersecting its edge, i.e. being exposed there, so that they are in effect slots. A similar row of holes 19 behind the opposite edges of the spacers 5 with cooperating holes in the membranes forms a second set of parallel conduits for the discharge of the electrolyte, these conduits communicating with a slot 20 that is made in the plate 10′ and leads to a discharge pipe 21.

Behind the first edge of the spacer 5 there is a second set of holes 23 which are in the same row as the holes 16 but which do not break into the edge of the spacer 5, since this is castellated as shown particularly in FIGURE 3. Behind the second edge there is also a second set of holes 24 in the same row as and alternating with the holes 19, but separated from the edge by material of the spacer.

The conduit-forming holes 16 serve for the flow of one electrolyte and the similar holes 23 for the discharge of the same electrolyte. The conduit-forming holes 19 serve for the supply and the holes 24 for the discharge of the second electrolyte. To admit the first electrolyte to and discharge it from the compartment within the spacer inserts 36 and 37 are provided. Each insert is formed of a plastic and has a number of holes, each of which is much smaller in cross-section than the holes forming the conduits. In FIGURE 3, the holes in an insert are indicated at 17. They may be circular or triangular in cross-section. It will be seen that the insert is itself rectangular in cross-section and its thickness the same as that of each spacer 5. Each hole 16, 19, 23 or 24 in it forming part of a conduit registers with several holes 17, so the electrolyte flowing through each conduit is split up into a smaller stream and is uniformly distributed over the whole breadth of the compartment.

In FIGURES 2 and 3 only five conduit-forming holes in each set are shown. In a spacer two feet wide there may be twelve or more conduit-forming holes in each set.

The second electrolyte flows through the remaining compartments, which are formed within the spacers 5′. This electrolyte enters through a pipe 26 and a slot in the plate which communicates with the set of parallel conduits formed by the holes 19, and leaves similarly at the other end through a pipe 28.

The cell as so far described is the subject of application Serial No. 50,913, filed August 22, 1960, of John B. Davis.

It is important to maintain the membranes at a proper spacing, so as to keep the width of each compartment constant. This is done, according to the present invention, by means of fillers 29.

The filler shown in FIGURES 4 and 5 is made by moulding a plastic between shaped platens. The moulding may comprise deformation of a plastic sheet or involve a casting technique. The product is a perforated sheet in which what may be regarded as warp threads 30 crossing weft threads 31, with all the threads 30 in one layer and all the threads 31 in another. As shown the resultant channels or slots, which may be ⅛ inch wide, are inclined to the direction of flow of liquid through the compartment in which the sheet forms a filler.

In making the filler shown in FIGURES 4 and 5, the plastic may be any suitable moulding or casting material with appropriate mechanical and chemical qualities, e.g. polythene, polystyrene or an epoxy resin.

The preferred form of filler is shown in FIGURES 6 and 7 and is composed of extruded threads of a plastic, preferably polythene of high density, thermally welded together. The filler is made by assembling two series of threads 32 and 33 in position to form the sheet and then thermally welding the crossing threads together at the crossing points. One series of threads may be preformed and laid on the other, or the assembly may be made by extruding the plastic, while hot, through nozzles to form both series. The thermal welding can be effected between hot platens or heated rollers. In any case the product comprises two layers of crossing threads bonded together at the crossing points.

Fillers as shown in FIGURES 6 and 7 can be made in any desired thickness by adjusting the extruding nozzles, or the heat-setting platens, or both. These platens are flat and are identical with ordinary plastics-press platens. If the material is a little too thick it can easily be reduced accurately by re-pressing even in the cold. Nevertheless, the material does not compress in use in the cell because the pressures involved there are insufficient. This accuracy of thickness means that the filler can be made to fill the thickness of the compartment very accurately. The material can be made with any desired thread pitch, however coarse. The threads cannot slip at all. These coarse materials exhibit very low back pressures to the water flowing through the compartment, and in fact far lower than can be achieved with the inevitably finer weaves and closer corrugations. Furthermore, it is quite impossible for the material to fray and so areas of any desired size can be cut accurately.

Striking advantages are obtained by the use of fillers according to the invention and are shown by the following comparative example.

Three electrodialytic cells were constructed, each consisting of 21 cation-selective and 21 anion-selective membranes, each 13¼ inch by 13¼ inch square and 0.030 inch thick, arranged alternately and separated by fibre spacers 0.050 inch thick in the form of hollow rectangles of inside dimensions 10 inch x 10 inch. The flow channels were arranged at the borders of the spacers with communications to the compartments to conduct the water into and out of the compartments in such a way as to form two separate streams, the one flowing through alternate compartments and the other flowing through the remaining compartments. Each stream flowed as five substreams through sets of five compartments in parallel, the sub-streams being combined when emerging from each set and the combined stream being divided again to enter the next set. Platinised titanium electrodes were arranged at each end of the assembly, the compartments containing them being fed with a separate stream of water. That electrode having an anion-exchange membrane adjacent to it was made the anode and that having a cation-selective membrane the cathode.

The compartments in cell No. 1 each contained a filler consisting of a corrugated perforated sheet of hard polyvinyl chloride. The holes were about 0.090 inch in diameter and were arranged with their centres 0.125 inch apart in a regular parallel pattern. The corrugations had a wave-length of 0.175 inch and the corrugated sheet was 0.045 inch thick overall.

The compartments in cell No. 2 each contained a filler consisting of a woven mesh of polyethylene thread. The threads were 0.026 inch in diameter and were 0.15 inch apart. The overall thickness was 0.048 inch.

The compartments in cell No. 3 contained a filler as shown in FIGURES 6 and 7, made of high density polyethylene. The "threads" were 0.025 inch thick and were set ½ inch apart. The overall thickness was 0.050 inch.

Each cell was fed with brackish water having a total dissolved solids content of 3000 p.p.m. at a flow rate of 90 gallons per hour through the desalting compartments and 22.5 gallons per hour through the alternate concentrating compartments. A current of 5.4 amps. was passed through the cell. The voltages necessary for this were respectively 18.6, 17.2, and 14.8 volts, corresponding to an energy consumption of 1.12, 1.03, and 0.89 kwh. per 1000 gallons. The significantly lower value for the cell with the filler of the invention is noticeable.

The pressure losses through the three cells were 2.2, 3.0, and 1.4 lb./sq. in. respectively. Again the lower value for the cell of the invention is noticeable.

In addition to these operating advantages the compartment filling of cell No. 3 could be handled repeatedly and stacked in piles for storage without any signs of deformation or fraying.

We claim:
1. In an electrodialytic cell comprising a stack of ion-permeable membranes separated by hollow frame-like spacers, the open centres of which form compartments which are bounded on their major faces by the membranes, and fillers of a plastic in said compartments for maintaining the membranes at proper spacing, the improvement in which the said fillers are unitary sheets resembling woven fabric in which the equivalent of the weft and warp threads do not interlace but form two layers with each weft thread in contact with and united to each warp thread that it crosses.

2. A cell as claimed in claim 1 in which the threads on each filler are inclined to the direction of flow of liquid through the compartment in which the distance piece lies.

3. In an electrodialytic cell comprising a stack of ion-permeable membranes separated by hollow frame-like spacers, the open centres of which form compartments which are bounded on their major faces by the membranes, and fillers of a plastic in said compartments for maintaining the membranes at proper spacing, the improvement in which the said fillers are mouldings resembling woven fabric in which the equivalent of the weft and warp threads do not interlace but form two layers with each weft thread in contact with and united to each warp thread that it crosses.

4. In an electrodialytic cell comprising a stack of ion-permeable membranes separated by hollow frame-like spacers, the open centres of which form compartments which are bounded on their major faces by the membranes, and fillers of a plastic in said compartments for maintaining the membranes at proper spacing, the improvement in which the said fillers are sheets of crossing threads in which the equivalent of the weft and warp threads in a woven fabric do not interlace but form two layers with each weft thread in contact with and thermally welded to each warp that it crosses.

References Cited in the file of this patent
UNITED STATES PATENTS

| | | |
|---|---|---|
| 2,758,083 | Van Hoek et al. | Aug. 7, 1956 |
| 2,919,467 | Mercer | Jan. 5, 1960 |